July 7, 1925.                         1,544,552
J. H. BOURGON
WINDSHIELD MOUNTING
Filed May 8, 1924
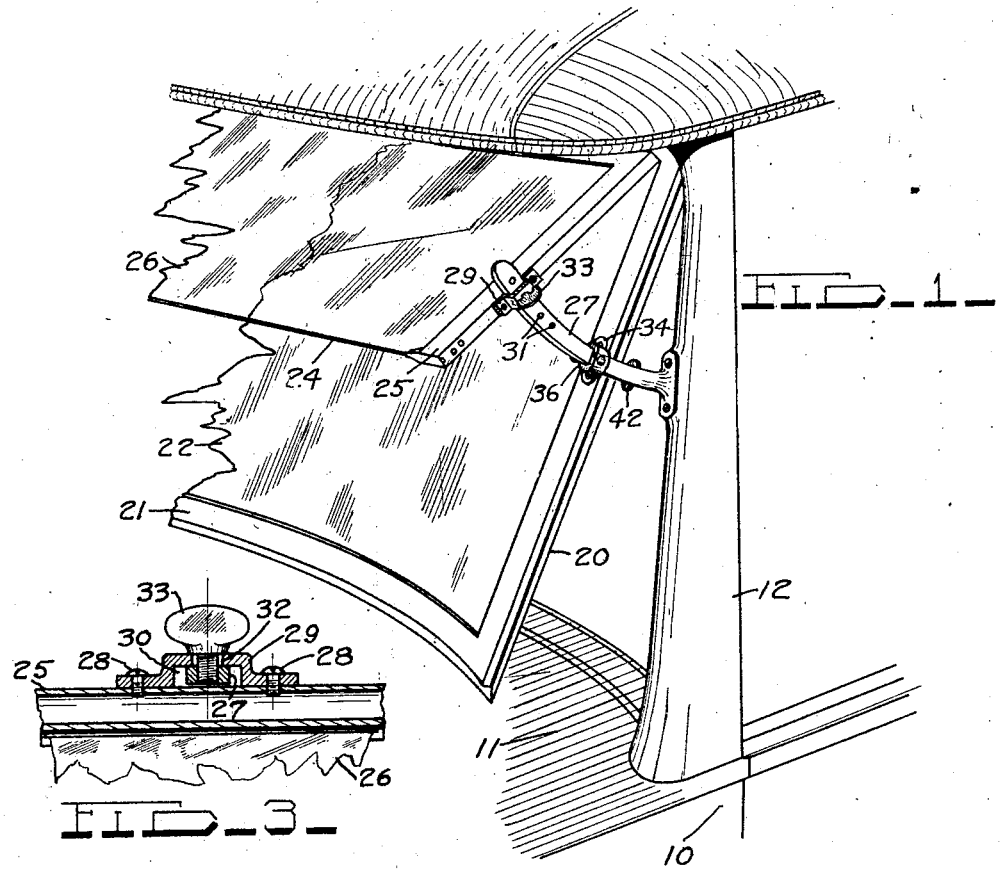
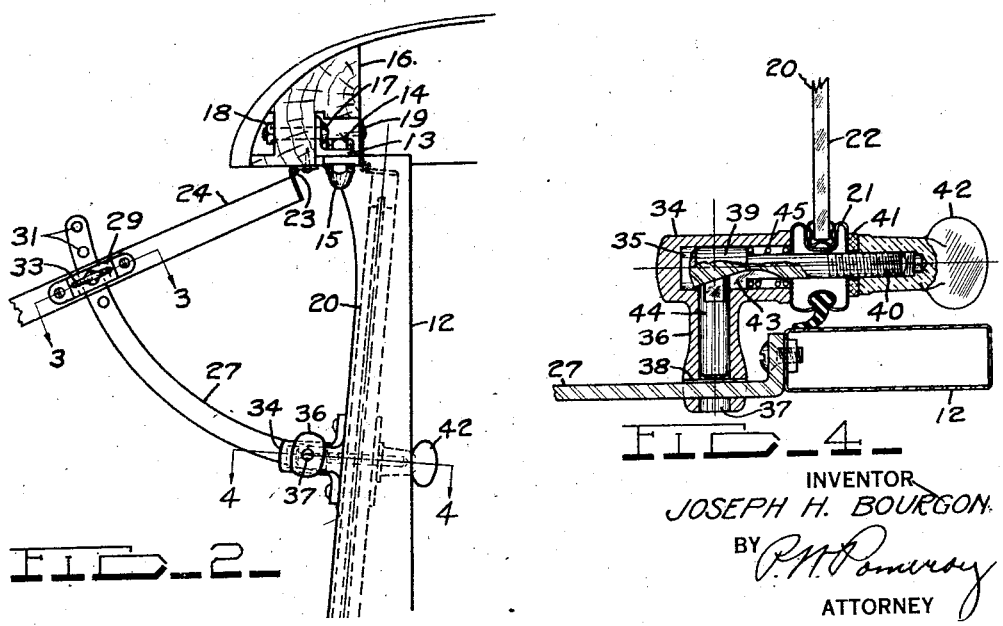
INVENTOR
JOSEPH H. BOURGON
BY
ATTORNEY Patented July 7, 1925.

1,544,552

UNITED STATES PATENT OFFICE.

JOSEPH H. BOURGON, OF DETROIT, MICHIGAN, ASSIGNOR TO THE STUDEBAKER CORPORATION, OF SOUTH BEND, INDIANA, A CORPORATION OF NEW JERSEY.

WINDSHIELD MOUNTING.

Application filed May 8, 1924. Serial No. 711,759.

*To all whom it may concern:*

Be it known that I, JOSEPH H. BOURGON, a subject of George V, King of Great Britain and Ireland, and resident of Detroit, in the county of Wayne and State of Michigan, have invented certain new and useful Improvements in Windshield Mountings, of which the following is a specification.

This invention relates to motor vehicles and the like and particularly to windshields and rain or sun shields therefor.

The principal object of this invention is to provide means whereby the windshield and rain or sun shield may both be held in adjusted position by the use of clamping members on a single arm or segment on each side of the automobile of which they form a part.

It is the conventional practice today on automobiles which are provided with adjustable rain or sun shields in addition to the adjustable windshield, to provide an entirely independent set of adjusting devices for each shield. In most cases where an adjustable rain or sun shield is used, it is adjustable along an arm or a segment attached to each side of the automobile, and a separate set of arms or other devices, independent of the rain or sun shield adjusting devices, is provided for adjustably holding the windshield in position. Such constructions necessarily involve a multiplicity of parts which, although they may cost only a nominal amount, nevertheless help to increase the ultimate price of the finished product, which necessitate a relatively long time for assembly, and in which the windshield adjusting devices usually produce unsightly projections on the interior of the automobile.

The object of the present invention is to eliminate as much as possible the objections mentioned, and the means by which this is done is to provide a single arm or segment on each side of the automobile, such as is usually employed for adjusting the rain or sun shield only, and provide not only means for adjusting the rain or sun shield thereon, but to also provide means for adjusting the windshield thereon.

The above being among the objects of the present invention, the same consists of certain features of construction and combination of parts to be hereinafter described with reference to the accompanying drawing, and then claimed, having the above and other objects in view.

In the accompanying drawing which shows a suitable embodiment of the present invention, and in which like numerals refer to like parts throughout the several views, Figure 1 is a fragmentary perspective view of a portion of an automobile in which an embodiment of the present invention is incorporated.

Figure 2 is a vertical sectional view taken longitudinally of the automobile of Figure 1 just outside of the windshield post.

Figure 3 is a fragmentary sectional view taken on the line 3—3 of Figure 2, illustrating the means used for locking the rain or sun shield in adjusted position.

Figure 4 is a fragmentary sectional view taken on the line 4—4 of Figure 2, illustrating a means which may be used for locking the windshield in adjusted position.

It will be understood that the drawing illustrates my invention as applied to one side of the automobile only, there being a duplication of the devices on the other side but of reversed construction. The drawing shows an automobile body 10, to which is secured and which extends upwardly from the rear edge of the cowl 11 the top front support 12, the upper end of which is secured to the angle bar 13 by means of the screw 14 and acorn nut 15, the angle bar 13 being, in turn, secured to the top front cross member 16 by the bolt 17 and nut 18. Pivotally secured to the rear face of the top front cross member 16 by the piano hinge 19 is a windshield 20 which is composed of a metal frame 21 and transparent glass 22. Pivotally secured to the underside of the top front cross member 16 forwardly of the hinge 19 by the piano hinge 23 is the rain or sun shield 24 which is composed of the metal frame 25 and glass or other material 26, the latter preferably being of such a nature as to absorb or diffuse the blinding glare of the sun.

Secured to and projecting forwardly and upwardly from approximately the midpoint of the top front support 12, and in a plane perpendicular to the axes of the hinges 19 and 23 is the segment 27, the extending portion of which is formed to the shape of an arc of a circle having a center at the pivotal line of the hinge 19. Straddling the segment 27 and secured by the screws 28 to the frame 25 of the rain or sun shield 24 is a bracket member 29 which is so shaped as to form an elongated slot 30 between it and the frame 25 for receiving the segment 27. Inasmuch as the rain or sun shield 24 is pivoted on a different center from the segment 27 it is evident that there will be a relative radial movement of the bracket member 29 in respect to the segment 27 when the rain or sun shield is pivoted about its hinge 23. The slot 30 is elongated to allow for this relative radial movement, and although it may be elongated to allow for any desired movement of the rain or sun shield 24, I have shown it elongated only an amount necessary to get the usual range of adjustment found necessary by the majority of drivers. It is, of course, apparent that more movement of the rain or sun shield 24 may be obtained by bringing the hinges 19 and 23 closer together or by making them coincident by well known methods, but in view of the small amount of adjustment usually required it is not thought necessary to provide more adjustment than that shown. Threaded openings 31 are provided in the end of the segment 27 at spaced intervals and the bracket 29 is provided with an opening 32 through which the thumb-nut 33 is adapted to pass and thread into one of the openings 31, drawing the segment 27 against the bracket 29 and locking it in that position in such a manner as to prevent any rattling thereof. By shifting the thumb nut to the different openings 31 any desired adjustment of the rain or sun shield 24 may be obtained.

The adjusting means for the windshield 20 is shown in section in Figure 4 and less clearly in Figures 1 and 2. It comprises a member 34 which rests against the face of the windshield frame 21 and is provided with an opening 35 perpendicular to the face of the windshield glass 22. Adjacent its forward end is a projecting part 36 extending out toward the side of the automobile in a plane parallel to the windshield and is provided with an axial opening 37, the axis of which intersects the axis of the opening 35, the two openings 35 and 37 joining each other as shown in Figure 4. Adjacent the end of the projecting part 36 and perpendicular to the axis of the opening 37 is a slot 38 which is adapted to slidably receive the segment 27. A piston 39 is axially slidable in the opening 35 and is provided with an extending stud portion 40 which projects through the windshield frame 21 and receives on its projecting end a washer 41 and thumb-nut 42. The piston 39 is provided with a recess 43 in its surface parallel to its axis, the bottom surface of the recess 43 being at an angle to the axis of the piston 39, and increasing in depth from the forward to the rear end thereof. Axially slidable in the opening 37 is a plug 44, the inner end of which is adapted to seat on the bottom of the recess 43 and the outer end of which extends up to a point adjacent the recess 38. It is apparent that when the thumb nut 42 is turned in the proper direction and the piston 39 is drawn rearwardly, the inclined bottom surface of the recess 43 acts as a wedge and forces the plug 44 outwardly, causing it to seat against the segment 27 and binds the latter against the side of the recess 38, locking the member 34 and therefore the windshield 20 in such position on the segment 27. A coil spring 45 surrounding the stud portion 40 of the piston 39 between the piston 39 and windshield frame 21 forces the piston forwardly upon reverse turning movement of the thumb nut 42, allowing the plug 44 to free the segment 27 in the recess 38 and allows the windshield 20 to freely pivot on its hinge 19. It will be noted that this locking means is small, simple and effective, and it allows the operating means therefor to be positioned inside of the driving compartment where it is readily accessible to the driver.

Although I have shown and described a specific form and means for locking the rain and sun shield and the windshield to the segment 27, it is to be noted that these form no part of my invention, but any such means as may be found advisable may be used to lock them to the segment 27.

Formal changes may be made in the specific embodiment of the invention described without departing from the spirit and substance of the broad invention, the scope of which is commensurate with the appended claims.

What I claim is:—

1. In a motor vehicle, a top, a pivotally mounted windshield, a pivotally mounted rain or sun shield adjacent said windshield, and a single segment on each side of said vehicle for clamping both of said shields thereto in adjusted pivotal position.

2. In a motor vehicle, a plurality of shields mounted to swing on different centers, and means for independently securing each of said shields in a plurality of positions along a single member on each side of said vehicle.

3. In combination with a motor vehicle, a plurality of shields pivotally attached thereto in adjacent relationship, and arm adjacent the ends of said shields, brackets on the ends of said shields co-operating with said arm, and means for locking said brackets to said arm in a plurality of positions.

4. In combination with a motor vehicle having a pivotally mounted windshield and a pivotally mounted rain or sun shield, a segment secured to each side of said vehicle and means for independently clamping each of said shields in a plurality of pivoted positions to said segment.

5. In a motor vehicle, a pivotally mounted windshield, and a rain or sun shield pivotally mounted adjacent thereto, an arm secured to each side of said vehicle adjacent the ends of said shields, and means co-operable with both of said shields and each of said arms for securing said shields in a plurality of pivotally adjusted positions.

6. The combination with a plurality of pivotally mounted members, of a stationary member adjacent the ends thereof, brackets secured to the ends of the first mentioned members provided with recesses for receiving said stationary members, and means for locking said brackets to said stationary members in any one of a plurality of pivotal positions of said first mentioned member.

7. In combination with a motor vehicle, a top, top front supports, and a plurality of shields pivotally mounted to said top, of a single curved stationary arm secured to and projecting forwardly of each of said top and front supports, brackets on the ends of said shields provided with recesses for receiving the corresponding arm, and means for independently clamping each of said brackets in a plurality of positions along said arms.

8. In combination with a motor vehicle, a top, supports for said top, a windshield pivoted to said top, another shield pivoted to said top forwardly of said windshield, a single arcuate arm adjacent each end of said windshield and secured to said supports, a bracket secured to each end of said windshield provided with an opening for receiving said arm, means for locking said bracket to said arm to hold said windshield in a plurality of pivotally adjusted positions, and a bracket on each end of the second mentioned shield provided with means for receiving and adjustably clamping said arm thereto in a plurality of pivotal positions.

Signed by me at Detroit, Michigan, U. S. A., this 3rd day of May, 1924.

JOSEPH H. BOURGON.

Witnesses:
 DONALD B. WAITE,
 HODGSON S. PIERCE.